J. DAMPMAN.
Horse Hay-Fork.
No. 98,236. Patented Dec. 28, 1869.
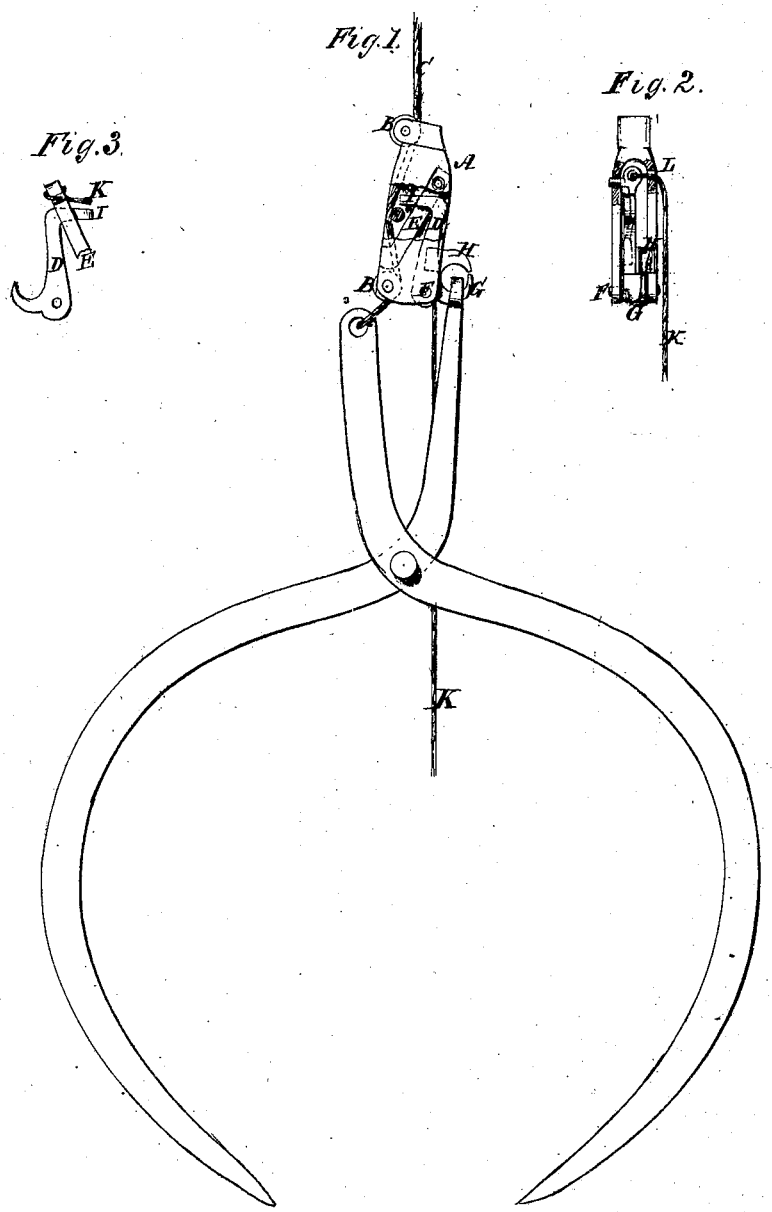

United States Patent Office.

JAMES DAMPMAN, OF LEBANON, PENNSYLVANIA, ASSIGNOR OF ONE-HALF OF HIS RIGHT TO WILLIAM A. MOYER, OF SAME PLACE.

Letters Patent No. 98,236, dated December 28, 1869.

IMPROVEMENT IN HAY-FORKS.

The Schedule referred to in these Letters Patent and making part of the same.

*To all whom it may concern:*

Be it known that I, JAMES DAMPMAN, of Lebanon, in the county of Lebanon, and State of Pennsylvania, have invented a new and useful Improvement in Horse Hay-Forks; and I do hereby declare that the following is a full, clear, and exact description thereof, which will enable others skilled in the art to make and use the same, reference being had to the accompanying drawing, forming part of this specification.

The invention relates to improvements in locking-devices for horse hay-forks; and consists in a sliding block on the elevating-rope, having a fixed and a pivoted jaw, for engaging and holding the upper end of the tine not connected to the hoisting-rope, the said upper end being provided with an eye, which, when brought up to the locking position, will receive the hooked end of the pivoted jaw, which is then closed up against the fixed jaw, by pressing the shank into the space between the sides of the movable block, where it is secured by a spring-catch, having a trip-cord connected to its free end, and passing out laterally through a hole in one of the sides of the block, so that when pulled, it will disengage the spring-catch, and trip the holding-jaw, to permit the opening of the tines of the fork for discharging.

Figure 1 is a side elevation of a fork, with my improved locking-device, a part of one of the side-plates of the latter being broken out, to show the arrangement of the pivoted jaw and spring-catch more clearly.

Figure 2 is a transverse section of block A, fig. 1.

Figure 3 is a side elevation of the pivoted jaw and spring-catch.

Similar letters of reference indicate corresponding parts.

A represents a block, composed of two plates, joined together at suitable distances apart to support sheaves B, for running on the hoist-rope C, passing between the plates, also for supporting between them the pivoted jaw D and spring-catch E.

This jaw is pivoted in the lower corner of the block, at F, and terminates in a hook, G, projecting out at one side from the space between the plates.

H is a permanent hook or jaw, fixed to one of the plates, and arranged relatively to the pivoted jaw, so that when the shank of the latter is pressed between the plates, the point G will close up against the point of the jaw H.

The shank of the jaw D is bent near the upper end, and assumes the form of a segment of a circle, or nearly so, as shown at I, and one side of this part I is provided with a notch, into which the spring-catch E falls when the shank I is pushed back.

K is the trip-cord, attached to the free end of the catch, and passing through the eye L, in the side of the block, hangs down to be pulled for disconnecting the catch from the shank I of the pivoted hook G, to allow the tines of the fork to separate and discharge the hay.

Having thus described my invention,

I claim as new, and desire to secure by Letters Patent—

The combination, with the tines of a hay-elevating fork, and the hoisting-rope thereof, of a sliding block, A, provided with a fixed and a pivoted jaw, arranged for engaging the tine not connected with the rope, also provided with a spring-catch and trip-rope, all arranged for operation substantially as specified.

JAMES DAMPMAN.

Witnesses:
 JACOB WEIDLE,
 WM. W. MURRAY.